United States Patent [19]
Christianson et al.

[11] Patent Number: 6,152,172
[45] Date of Patent: Nov. 28, 2000

[54] HALL EFFECT VALVE SPOOL POSITION SENSOR

[75] Inventors: Rollin Christianson, Delafield; Raud Wilke, Dousman; Leif Pedersen, Waukesha, all of Wis.

[73] Assignee: Husco International, Inc., Waukesha, Wis.

[21] Appl. No.: 09/362,380

[22] Filed: Jul. 28, 1999

[51] Int. Cl.[7] .......................... F16K 37/00; F15B 13/044
[52] U.S. Cl. ...................... 137/554; 137/625.65
[58] Field of Search ................................ 137/553, 554, 137/625.62, 625.64, 625.65

[56] References Cited

U.S. PATENT DOCUMENTS

| | | |
|---|---|---|
| 4,310,143 | 1/1982 | Determan . |
| 4,538,644 | 9/1985 | Knutson et al. . |
| 4,635,439 | 1/1987 | Wible . |
| 4,693,272 | 9/1987 | Wilke . |
| 5,032,812 | 7/1991 | Banick et al. . |
| 5,101,856 | 4/1992 | Kakinuma et al. ............ 137/625.65 X |
| 5,244,002 | 9/1993 | Frederick . |
| 5,565,770 | 10/1996 | Jones . |
| 5,787,915 | 8/1998 | Byers et al. ......................... 137/554 X |
| 5,826,616 | 10/1998 | Golden ..................................... 137/554 |

*Primary Examiner*—Kevin Lee
*Attorney, Agent, or Firm*—Quarles & Brady LLP; George E. Haas

[57] ABSTRACT

A hydraulic control valve has a spool slidably received in a bore of the valve body. The spool can be moved in opposite directions to control flow fluid to and from a pair of workports. A sensor assembly has a coupling attached to the spool and holds a permanent magnet. A Hall effect sensor produces an electrical signal indicating the position of the permanent magnet and thus the spool. A double acting spring assembly biases the coupling and spool with respect to the housing of the sensor when the spool moves in one direction, and biases the coupling and spool with respect to the valve body when the spool moves in the other direction.

14 Claims, 2 Drawing Sheets

HALL EFFECT VALVE SPOOL POSITION SENSOR

FIELD OF THE INVENTION

The present invention relates to valve assemblies which control hydraulically powered machinery; and more particularly to valve assemblies which incorporate a mechanism for sensing the position of an internal control spool.

BACKGROUND

Many types of machines have moveable members which are operated by a hydraulic cylinder that is supplied with fluid under pressure to move a piston within the cylinder. A valve controls application of the fluid to the cylinder. In a typical machine a combination of valves control multiple functions, such as raising and lowering a boom of a backhoe, tilting or rotating the boom, and sliding members fore and aft. By varying the degree to which the valve is opened, the flow rate of the hydraulic fluid can be varied thereby moving the piston at proportional speeds. The Wilke U.S. Pat. No. 3,469,272, discloses a basic reciprocal spool valve for controlling the flow of the hydraulic fluid.

Typically the valve is operated manually by a lever that was mechanically connected to the spool. However a present trend is away from using manually operated hydraulic valves toward electrically controlled solenoid valves. Solenoid valves are well known electromagnetic actuated devices for controlling the fluid flow. A solenoid valve involves an electromagnetic coil which moves an armature in one direction to open a valve. The amount that the solenoid valve is opened is controlled by varying the electric current applied to the solenoid coil. Either the armature or a valve member is spring loaded so that the valve closes when the electric current is removed from the solenoid coil.

With either mechanically, electrically, or hydraulic pilot operated valves it often is desirable to sense the position of the spool and provide an electrical signal which indicates that position. Such sensing must not add excessive load to the movement of the valve spool.

SUMMARY OF THE INVENTION

A general object of the present invention is to provide a mechanism for sensing the position of the spool of a control valve.

Another object is to utilize a double acting spring assembly to return the sensing mechanism to a centered neutral position when the valve is to be closed.

A further aspect of the preferred embodiment of the present invention is the employ a Hall effect transducer to sense the position of the valve spool.

These and other objectives are satisfied by a hydraulic control valve which has a body with an inlet and an outlet, both of which communicate with a bore in the body. A spool is received in the bore and can be moved therein in a first direction or a second direction.

A sensor assembly is included to provide an indication of the relative position of the spool in the bore. The sensor assembly has a coupling attached to the spool and holding a permanent magnet. A Hall effect sensor is mounted adjacent the permanent magnet and produces an electrical signal indicating the position of the permanent magnet and thus the spool. A double acting spring assembly biases the coupling and spool with respect to the housing when the spool moves in the first direction, and biases the coupling and spool with respect to the body when the spool moves in the second direction.

In the preferred embodiment of the present invention, the double acting spring assembly includes a first spring seat, a second spring seat and a compression spring there between. Specifically, the first spring seat may be tubular with a first inwardly projecting flange that engages the coupling extending there through, and has a first outwardly projecting flange that engages the housing. The second spring seat also may be tubular with a second inwardly projecting flange that engages the end of the spool extending there through, and has a second outwardly projecting flange that engages the body.

It is preferred that the coupling and the housing are made of a non-magnetic material which does not interfere with the magnetic position sensing by the Hall effect sensor. Also preferred for the same reason is that the magnet be held in a portion of the coupling that is not within the spring.

DETAILED DESCRIPTION OF THE INVENTION

Figure 1:
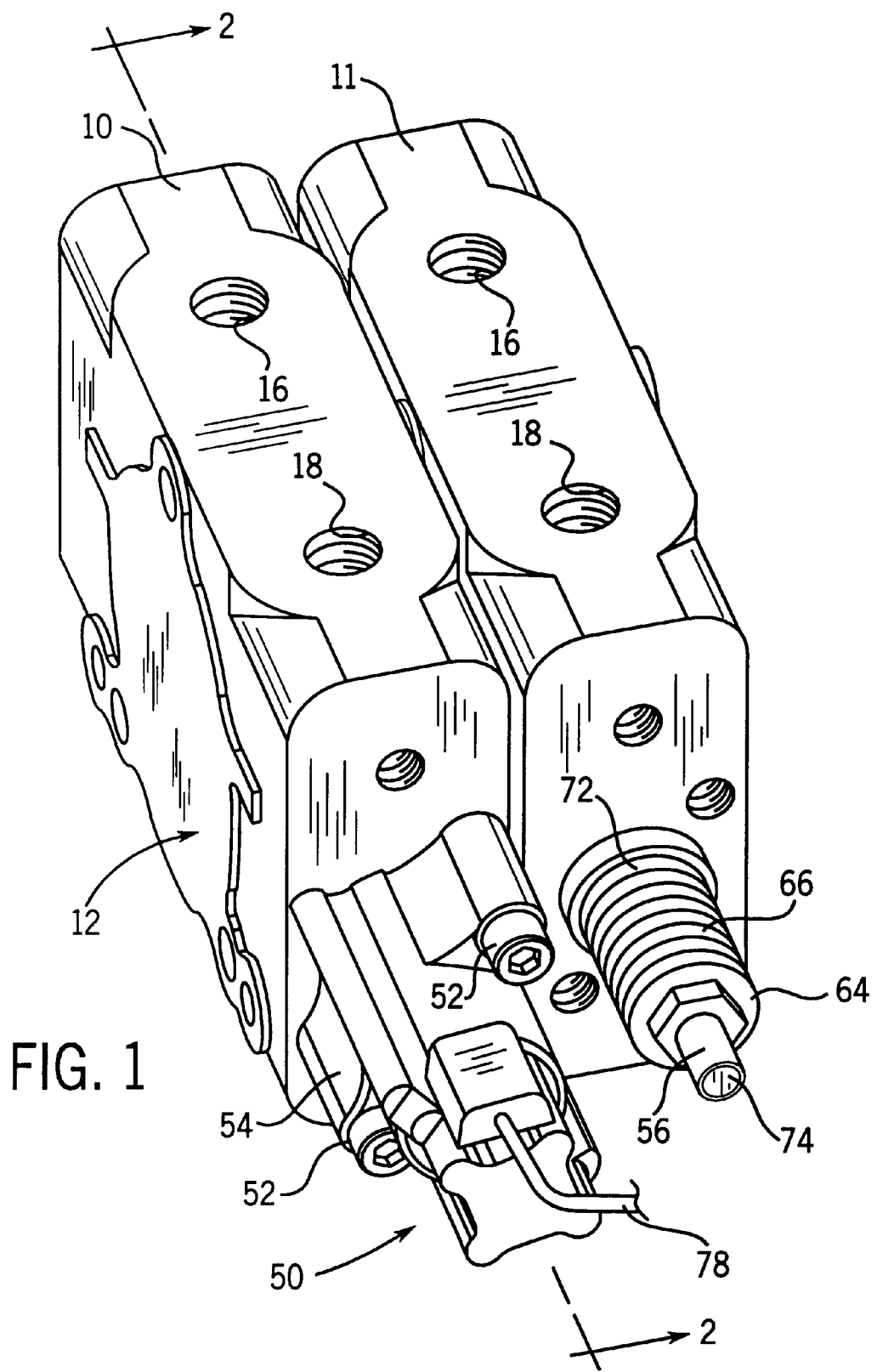
FIG. 1 is an isometric view of a pair of abutting segments of a multiple valve assembly which incorporated the present invention.

FIG. 1 illustrates a pair of sections 10 and 11 of a hydraulic valve assembly 12 which controls all motions of hydraulically powered working members of a machine, such as the boom and bucket of a backhoe. The individual valve sections 10 and 11 are interconnected side-by-side between end sections which have been removed and to which lines from the pump and reservoir tank are attached. Each section 10 and 11 controls one degree of movement of a working member connected to workports 16 and 18.

Figure 2:
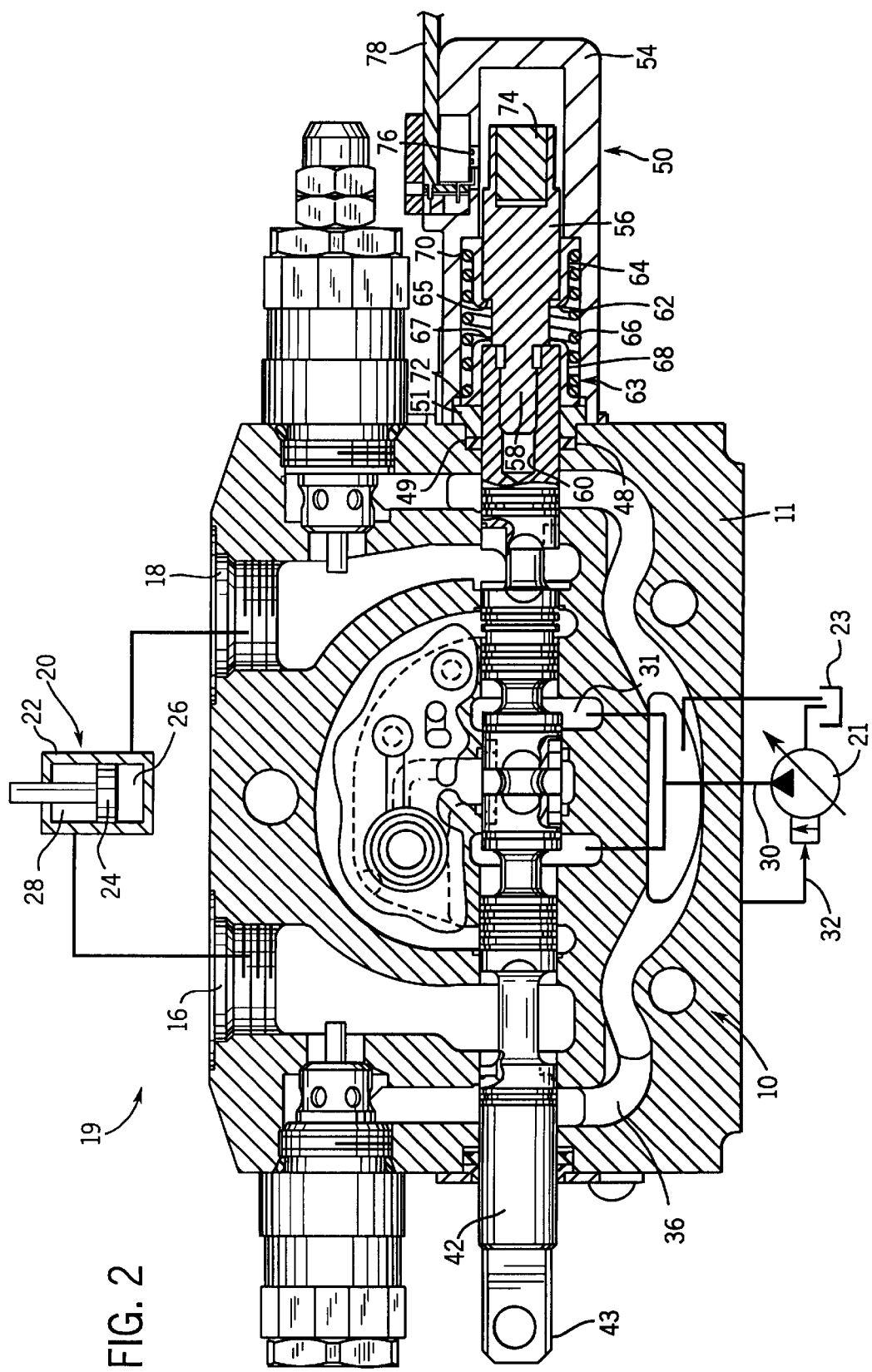
FIG. 2 is a cross-sectional view along line 2—2 in FIG. 1 with pressure reducers mounted on the valve section.

The valve assembly is part of a hydraulic system 19 shown in FIG. 2 with respect to valve section 10. That valve section 10 controls the flow of hydraulic fluid from pump 21 to one of several actuators 20 for the working members of the machine and controls return of the fluid to a reservoir or tank 23. Each actuator 20 has a cylinder housing 22 within which is a piston 24 that divides the housing interior into a bottom chamber 26 and a top chamber 28. The bottom chamber 26 is connected to one workport 18 of the valve section 10, while the top chamber 28 is connected to the other workport 16.

The pump 21 typically is located remotely from the valve assembly 12 and is connected by a supply conduit or hose 30 to a supply passage 31 extending through the valve assembly 12. The control input port 32 is connected to a transfer passage (not shown) that extends through the sections 10 and 11 of the valve assembly 12. A reservoir passage 36 also extends through the valve assembly 12 and is coupled to the tank 23.

The valve section 10 has a control spool 42 which a machine operator can move in reciprocal axial directions within a bore in the body 11 of the valve section by operating a control lever (not shown) attached by a linkage to one end 43. Alternatively, a linear actuator, such as a solenoid, or a hydraulic pilot may be attached to the one end 43 to operate the spool. The control spool 42 has a series of annular recesses which provide fluid passages through the bore in selected positions of the spool within the bore of the valve body. Depending on which way the spool 42 is moved, hydraulic fluid from the pump is directed through one of the workports 16 or 18 to the bottom chamber 26 or top chamber 28, respectively, of a cylinder housing 22. That fluid flow drives the piston 24 up or down. Fluid in the other chamber 28 or 26 flows through the valve section 10 to the tank 23.

The extent to which the machine operator moves the control spool 42 determines the speed of the working member connected to the piston 24. References herein to directional relationships and movement, such as top and bottom or up and down, refer to the relationship and movement of the components in the orientation illustrated in the drawings, which may not be the orientation of components in a particular implementation of the valve assembly 12.

The position of the spool 42 is detected by sensor assembly 50 mounted on the body 11 of the valve section 10 at the other end of the spool. The sensor assembly 50 has a housing 54 of non-magnetic material, such as aluminum or composite material, that is attached by bolts 52 over an aperture 48 in body 11 through which the other end of the spool 42 projects. A ring 51 which is part of the valve body 11 is slid snugly into aperture 48 by the housing 54 thereby compressing and O-ring or lip seal 49 to provide a fluid tight seal around the spool 42.

Within housing 54 is a non-magnetic, cylindrical coupling 56 with one end 58 threaded into an aperture 60 in the adjacent end of the spool 42. Coupling 56 extends through a double acting spring assembly 63 formed by a tubular first spring seat 64, a coil spring 66 and a tubular second spring seat 68. Specifically, the first spring seat 64 has an inwardly projecting flange 65 at one end that engages an annular shoulder 62 of the coupling 56 when the spool 42 is in the centered, neutral position illustrated in FIG. 2. The other end of the first spring seat 64 has an outwardly projecting flange 70 which abuts a rim inside the housing 54 in this position. An end of the spring 66 rests against that outwardly projecting flange 70. The tubular second spring seat 68 has an identical construction as the first spring seat 64 with an inwardly projecting flange 67 at one end that engages the end surface of the spool 42 in the centered, neutral position. An outwardly projecting flange 72 at the other end of the second spring seat 68 abuts the ring 51 and another end of the spring 66 rests against that outwardly projecting flange. Thus the spring 66 applies a force which biases the two spring seats 64 and 68 apart.

The exposed end of the coupling 56 has an aperture within which is received a cylindrical permanent magnet 74. One pole of the permanent magnet 74 is at the exposed surface while the other pole is at the innermost surface. A Hall effect sensor 76 is mounted to the housing through a hole which is aligned with the center of the permanent magnet 74 when the spool 42 is in the centered, neutral position as illustrated in FIG. 2. As the spool 42 and the permanent magnet 74 coupled thereto are moved axially, the Hall effect sensor 76 produces an electrical signal on cable 78 which varies proportionally with the location of the magnet and thus indicates the relative position of the spool.

Of importance is the use of non-magnetic material for the coupling 56 that holds the permanent magnet 74 and for the housing 54 within which the Hall effect sensor 76 is mounted. In addition, the magnetic components such as the spring 66 and bolts 52 are remote from the magnetic field produced by the permanent magnet 74. Therefore, these components will not interfere with the magnetic based position sensing.

The double acting spring assembly 63 serves to center the spool 42 and magnet 74 between the extremes of their axial travel. In this centered position as depicted in FIG. 2, the spring 66 forces the two spring seats away from each other so that inward flange 65 of the first spring seat 64 pulls the coupling 56 and the spool rightward in the drawings until the spring seat's outward flange 70 abuts the housing rim. The spring force also is exerted on the second spring seat 68 which thereby is pushed to the left against the ring 51 and the end of the spool 42.

Assume that the machinery operator actuates the linkage connected to end 43 to move the spool 42 toward the right in FIG. 2. This action causes the other end of the spool to push the second spring seat 68 toward the first spring seat 64 which is held in place against the rim of housing 54, thus compressing the spring 66. This movement of the spool and attached coupling 56 also produes movement of the permanent magnet 74 with respect to the Hall effect sensor 76. As a result, the voltage of the signal from the Hall effect sensor 76 changes in an amount that indicates the amount of the rightward movement of the spool. When the operator releases the force applied to end 43 of the spool 42, the spool and the sensor assembly 50 return to the illustrated centered, neutral position as the spring 66 relaxes and expands.

Now assume that the machinery operator actuates the linkage to move the spool 42 toward the left in FIG. 2. This action causes the shoulder 62 of the coupling 56 to push the first spring seat 68 toward the second spring seat 64 which is held in place against the ring 51, thus compressing the spring 66. The permanent magnet 74 mounted in the coupling 56 also moves producing a change in the voltage of Hall effect sensor signal in proportion to the amount of movement. Thereafter, when the operator releases the force applied to end 43 of the spool 42, the spool and the sensor assembly 50 return to the illustrated centered, neutral position as the spring 66 relaxes and expands.

The novel double acting spring assembly 63 exerts a force on the spool and coupling which returns those elements to the centered, neutral position regardless of which axial direction the components are moved by the operator.

We claim:

1. A hydraulic control valve comprising:

a valve body having a bore with an axis, an inlet in communication with the bore and an outlet in communication with the bore;

a spool has an end and is received in the bore to control the flow of fluid between the inlet and the outlet, the spool can be moved axially in either a first direction or a second direction within the bore;

a sensor assembly including a housing, a coupling connected to the spool to move therewith, a permanent magnet attached to the coupling, and a magnetic sensor mounted adjacent to the permanent magnet for producing an electrical signal which varies in correspondence with changes in position of the permanent magnet; and a double acting spring assembly operatively coupled to bias the coupling and spool with respect to the housing when the spool moves in the first direction and to bias the coupling and spool with respect to the valve body when the spool moves in the second direction.

2. The hydraulic control valve as recited in claim 1 wherein the double acting spring assembly comprises:

a first spring seat for engaging the coupling and the housing;

a second spring seat for engaging the spool and the valve body; and a spring abutting both the first and second spring seats.

3. The hydraulic control valve as recited in claim 2 wherein:
   the first spring seat is tubular and the coupling extends therein; and
   the second spring seat is tubular and the coupling extends therein.

4. The hydraulic control valve as recited in claim 1 wherein the double acting spring assembly comprises:
   a first spring seat having a first inwardly projecting flange that engages the coupling, and a first outwardly projecting flange that engages the housing;
   a second spring seat having a second inwardly projecting flange that engages the end of the spool, and a second outwardly projecting flange that engages the valve body; and
   a spring abutting both the first and second spring seats.

5. The hydraulic control valve as recited in claim 4 wherein the coupling has a shoulder which is engaged by the first spring seat.

6. The hydraulic control valve as recited in claim 1 wherein the housing and coupling are made of non-magnetic material.

7. The hydraulic control valve as recited in claim 1 wherein the permanent magnet attached to a portion of the coupling which is not within the spring.

8. The hydraulic control valve as recited in claim 1 wherein the permanent magnet has a center along the axis of the bore and the magnetic sensor is aligned with that center.

9. A hydraulic control valve comprising:
   a valve body having a supply inlet, a drain outlet, a workport and a bore in communication with the supply inlet, the drain outlet and the workport;
   a spool with an end and being slidably received in the bore, the spool having a neutral position in which the spool blocks flow of fluid between the workport and both the supply inlet and outlet, the spool being moveable a first direction from the neutral position to enable fluid to flow from the supply inlet to the workport and being moveable a second direction from the neutral position to enable fluid to flow from the workport to the drain outlet;
   a sensor assembly including a coupling connected to the spool to move therewith, a permanent magnet attached to the coupling, and a Hall effect sensor mounted adjacent to the permanent magnet for producing an electrical signal which varies in correspondence with a position of the permanent magnet with respect to the Hall effect sensor; and
   a double acting spring assembly operatively couple to bias the coupling and spool with respect to the housing when the spool moves in the first direction, and to bias the coupling and spool with respect to the valve body when the spool moves in the second direction.

10. The hydraulic control valve as recited in claim 9 wherein the double acting spring assembly comprises:
    a first spring seat for engaging the coupling and the housing;
    a second spring seat for engaging the spool and the valve body; and
    a spring abutting both the first and second spring seats.

11. The hydraulic control valve as recited in claim 10 wherein:
    the first spring seat is tubular and the coupling extends therein; and
    the second spring seat is tubular and the coupling extends therein.

12. The hydraulic control valve as recited in claim 9 wherein the double acting spring assembly comprises:
    a first spring seat having a first inwardly projecting flange that engages the coupling, and a first outwardly projecting flange that engages the housing;
    a second spring seat having a second inwardly projecting flange that engages the end of the spool, and a second outwardly projecting flange that engages the valve body; and
    a spring abutting both the first and second spring seats.

13. The hydraulic control valve as recited in claim 12 wherein the coupling has a shoulder which is engaged by the first spring seat.

14. The hydraulic control valve as recited in claim 9 wherein the spool has a longitudinal axis, the permanent magnet has a center along the longitudinal axis, and the magnetic sensor is aligned with that center.

* * * * *